(12) United States Patent
Shimada

(10) Patent No.: US 9,142,897 B2
(45) Date of Patent: Sep. 22, 2015

(54) CONNECTOR

(71) Applicant: JAPAN AVIATION ELECTRONICS INDUSTRY, LIMITED, Shibuya-ku, Tokyo (JP)

(72) Inventor: Masaaki Shimada, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

(21) Appl. No.: 14/467,334

(22) Filed: Aug. 25, 2014

(65) Prior Publication Data

US 2015/0099399 A1 Apr. 9, 2015

(30) Foreign Application Priority Data

Oct. 4, 2013 (JP) ................................ 2013-209490

(51) Int. Cl.
*H01R 24/00* (2011.01)
*H01R 12/70* (2011.01)
*H01R 12/71* (2011.01)
*H01R 13/24* (2006.01)

(52) U.S. Cl.
CPC .......... *H01R 12/7005* (2013.01); *H01R 12/714* (2013.01); *H01R 13/2464* (2013.01)

(58) Field of Classification Search
CPC ....................................................... H01R 27/00
USPC ......................................................... 439/630
See application file for complete search history.

(56) References Cited

U.S. PATENT DOCUMENTS

| | | | |
|---|---|---|---|
| 8,109,794 B2 | 2/2012 | Tanaka et al. | |
| 8,235,753 B2 | 8/2012 | Tanaka et al. | |
| 8,465,325 B1 * | 6/2013 | Chan et al. | 439/630 |
| 2005/0260892 A1 | 11/2005 | Sato | |
| 2006/0040560 A1 * | 2/2006 | Uchida et al. | 439/630 |
| 2010/0144179 A1 * | 6/2010 | Guo et al. | 439/159 |
| 2010/0178807 A1 | 7/2010 | Hashimoto et al. | |
| 2011/0189897 A1 * | 8/2011 | Yu et al. | 439/630 |
| 2012/0108091 A1 * | 5/2012 | Takai | 439/153 |
| 2012/0276780 A1 * | 11/2012 | Hu et al. | 439/630 |

FOREIGN PATENT DOCUMENTS

| | | |
|---|---|---|
| JP | 48030755 U | 4/1973 |
| JP | 2002367697 A | 12/2002 |
| JP | 2004127693 A | 4/2004 |
| JP | 2005339837 A | 12/2005 |
| JP | 2009021192 A | 1/2009 |
| JP | 4385047 B2 | 12/2009 |
| JP | 2010135137 A | 6/2010 |
| JP | 2010161012 A | 7/2010 |

OTHER PUBLICATIONS

Japanese Office Action dated Sep. 25, 2014, issued in counterpart Japanese Application No. 2013-209490.

* cited by examiner

*Primary Examiner* — Phuong Dinh
(74) *Attorney, Agent, or Firm* — Holtz, Holtz, Goodman & Chick PC

(57) ABSTRACT

A connector is attachable to an object and connectable to a card inserted rearward. The connector has a predetermined portion which is located at a position same as that of an upper surface of the object. The connector comprises a housing and a contact. The contact has a held portion and a spring portion. The held portion is held by the housing. The spring portion has a contact portion and a guide portion. The contact portion is located forward of the held portion. The guide portion is located forward of the contact portion. When the card is inserted in the connector, the contact portion is brought into contact with the card. In the meantime, the guide portion is moved downward without being brought into contact with any part of the connector, and at least a part of the guide portion is located below the predetermined portion.

15 Claims, 12 Drawing Sheets

CONNECTOR

CROSS REFERENCE TO RELATED APPLICATIONS

An applicant claims priority under 35 U.S.C. §119 of Japanese Patent Application No. JP2013-209490 filed Oct. 4, 2013.

BACKGROUND OF THE INVENTION

This invention relates to a connector to be connected to a card such as a Subscriber Identity Module (SIM) card.

For example, this type of card connector is disclosed in JP-B 4385047 (Patent Document 1), the content of which is incorporated herein by reference.

As shown in FIG. 23, the card connector of Patent Document 1 comprises an accommodation portion and a plurality of contacts. The accommodation portion accommodates a card inserted into the card connector along an insertion direction. The contacts are arranged within the accommodation portion. Each of the contacts has a first fulcrum portion, a first flat spring, a second fulcrum portion and a second flat spring. The first fulcrum portion is constantly in contact with a bottom of the accommodation portion. The first flat spring extends from the first fulcrum portion in an ejection direction opposite to the insertion direction. The second fulcrum portion is located at an end of the first flat spring. The second fulcrum portion is brought into contact with the bottom of the accommodation portion when the first flat spring is bent downward with the first fulcrum portion as fulcrum. The second flat spring extends from the second fulcrum portion in the insertion direction of the card. An end of the second flat spring functions as a contact portion which is to be brought into contact with an electrode of the card.

The contact of the card connector like that of Patent Document 1 needs to be provided with a guide portion in order to be prevented from being buckled upon an abutment with the card. The guide portion needs to be located forward of the contact portion. For example, the second flat spring of Patent Document 1 functions as the guide portion. It is preferable that the guide portion extends long while sloping relative to the insertion direction. On the other hand, a connector, which is to be connected to a micro SIM card or a nano SIM card, is required to be reduced in size depending on a size of the card. Moreover, as the size of the card becomes smaller, a position of the electrode of the card needs to be nearer to the end of the card. Accordingly, in order for the connector to be reduced in size, the contact portion of the contact needs to be nearer to an insertion opening. When the contact portion is near to the insertion opening, it is difficult to make the guide portion sufficiently long. Thus, when the connector is reduced in size, it is difficult to provide the guide portion having sufficient length.

SUMMARY OF THE INVENTION

It is therefore an object of the present invention to provide a connector which can be reduced in size and which can be provided with a contact including a guide portion having sufficient length.

One aspect (first aspect) of the present invention provides a connector which is attachable to an object having an upper surface in an up-down direction and is connectable to a card inserted rearward thereinto along a front-rear direction perpendicular to the up-down direction. The connector has a predetermined portion. When the connector is attached to the object, the predetermined portion is located at a position same as that of the upper surface in the up-down direction. The connector comprises a housing and a contact. The contact has a held portion and a spring portion. The held portion is held by the housing. The spring portion has a contact portion and a guide portion. The contact portion is located forward of the held portion in the front-rear direction. The guide portion is located forward of the contact portion in the front-rear direction. The guide portion extends forward while sloping downward. The contact portion and the guide portion are movable in the up-down direction. The contact portion is brought into contact with the card under an accommodating state where the card is inserted and accommodated in the connector. During an insertion of the card, the guide portion is moved downward without being brought into contact with any part of the connector. At least a part of the guide portion is located below the predetermined portion in the up-down direction under the accommodating state.

Another aspect (second aspect) of the present invention provides a connector which is connectable to a card inserted rearward thereinto along a front-rear direction. The connector comprises a housing and a contact. The contact has a held portion and a spring portion. The held portion is held by the housing. The spring portion is resiliently deformable in an up-down direction perpendicular to the front-rear direction. The spring portion has a narrow portion. The spring portion has a size in a width direction perpendicular to both the up-down direction and the front-rear direction, wherein the size at a part of the spring portion becomes smaller as the part approaches the narrow portion away from a part located forward of the narrow portion and another part located rearward of the narrow portion.

According to the first aspect of the present invention, when the connector is attached to the object, the predetermined portion of the connector is located at the position same as that of the upper surface of the object. When the card is inserted into the connector, the guide portion of the connector is moved downward beyond the predetermined portion without being brought into contact with any part of the connector. Since the connector according to the first aspect has the aforementioned structure, the guide portion of the contact is movable downward beyond the upper surface of the object without being brought into contact with any part of the object when the card is inserted into the connector which is attached to the object. Accordingly, the contact can be provided with the guide portion having sufficient length while the connector is reduced in size.

An appreciation of the objectives of the present invention and a more complete understanding of its structure may be had by studying the following description of the preferred embodiment and by referring to the accompanying drawings.

Figure 1:
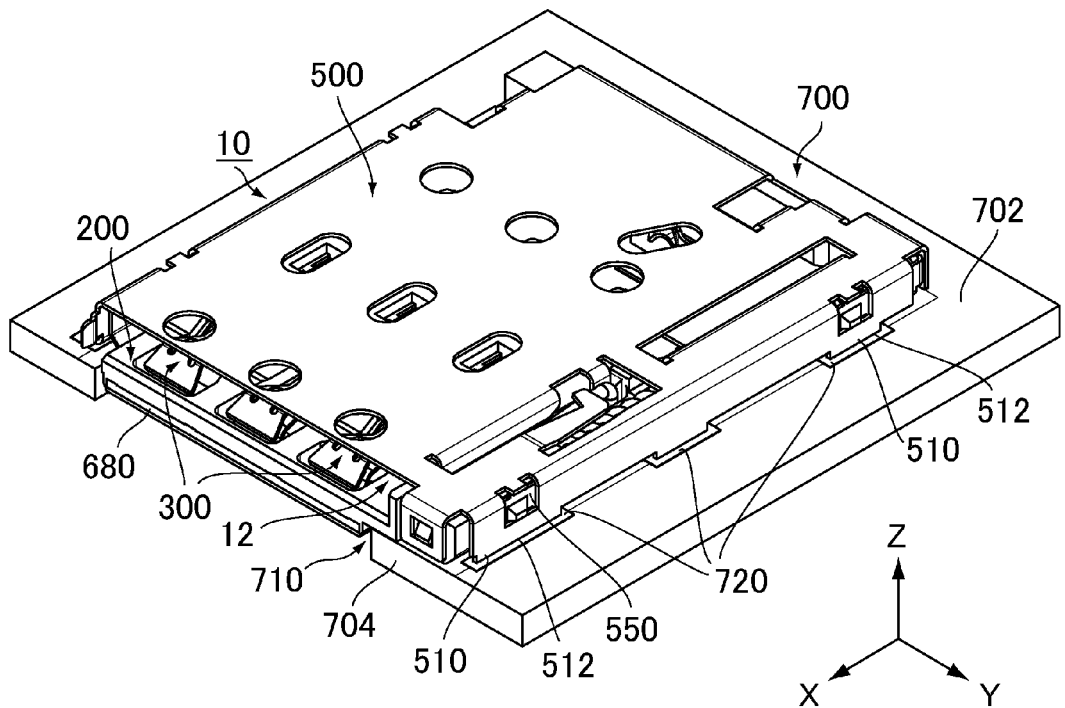
FIG. 1 is a perspective view showing a connector according to an embodiment of the present invention, wherein the connector is mounted on a circuit board.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Figure 2:
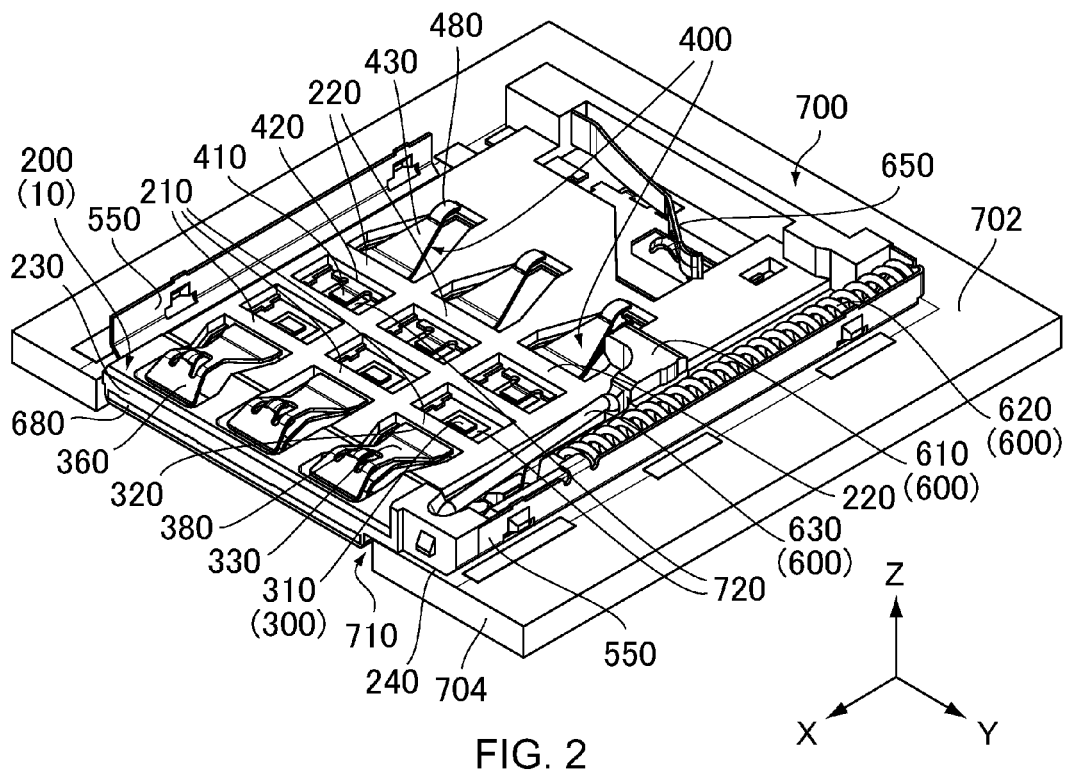
FIG. 2 is a perspective view showing the connector of FIG. 1 under a state where a cover of the connector is removed.
Figure 3:
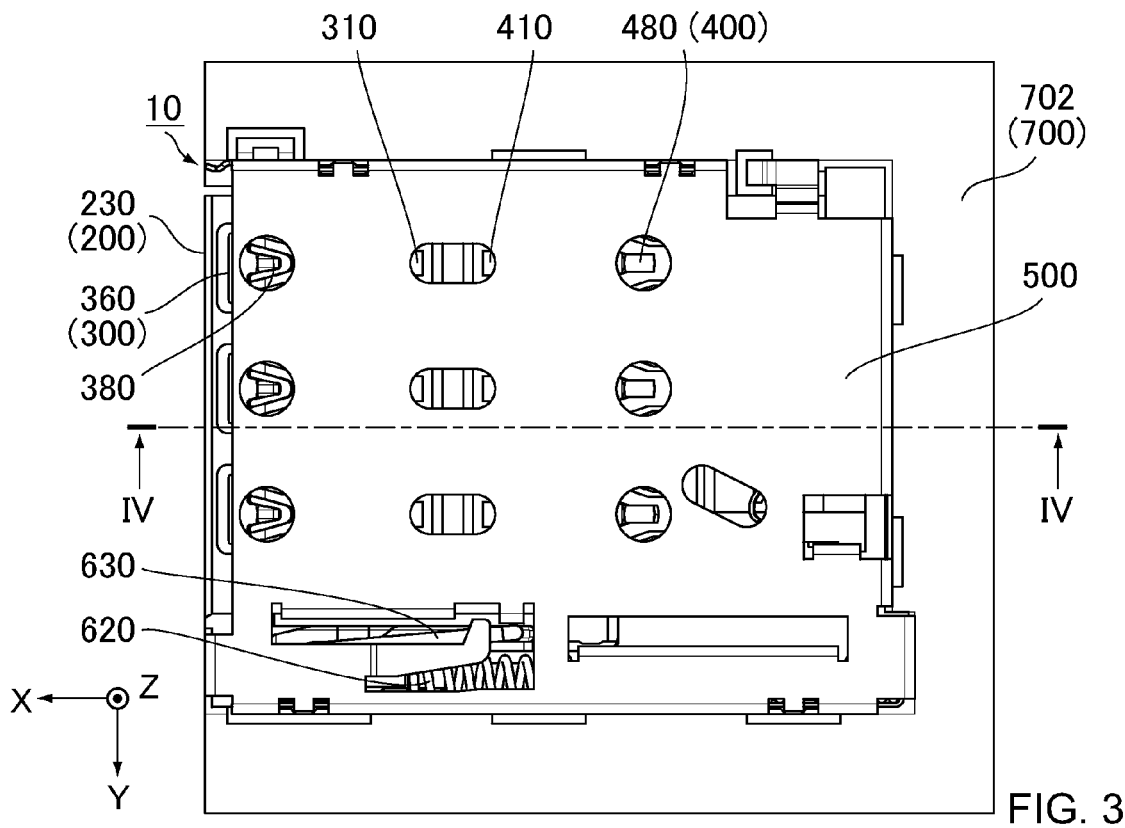
FIG. 3 is a top view showing the connector of FIG. 1.

DESCRIPTION OF PREFERRED EMBODIMENTS:

As shown in FIGS. 1 to 3, a connector 10 according to an embodiment of the present invention is a board connector attachable to an object (circuit board) 700. The object according to the present embodiment is the circuit board 700. However, the present invention is also applicable to a connector which is to be attached to an object other than the circuit board.

Figure 6:
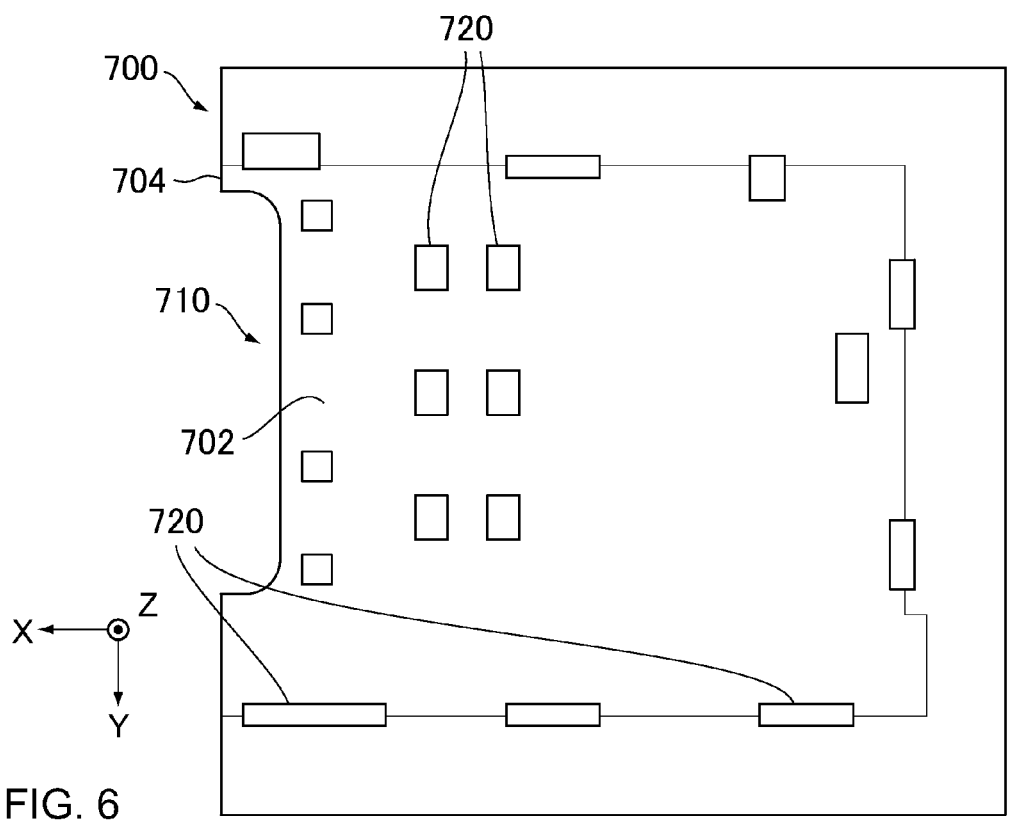
FIG. 6 is a top view showing the circuit board of FIG. 1.

As shown in FIG. 6, the circuit board 700 according to the present embodiment has an upper surface 702 in an up-down direction (Z-direction) and a front end 704 in a front-rear direction (X-direction). The upper surface 702 is provided with a plurality of connection pads (fixing portions) 720 having various sizes. The fixing portions 720 are electrically connected to conductive patterns (not shown) of the circuit board 700.

The circuit board 700 is formed with a cut 710. The cut 710 extends rearward (in the negative X-direction) from the front end 704.

Figure 4:
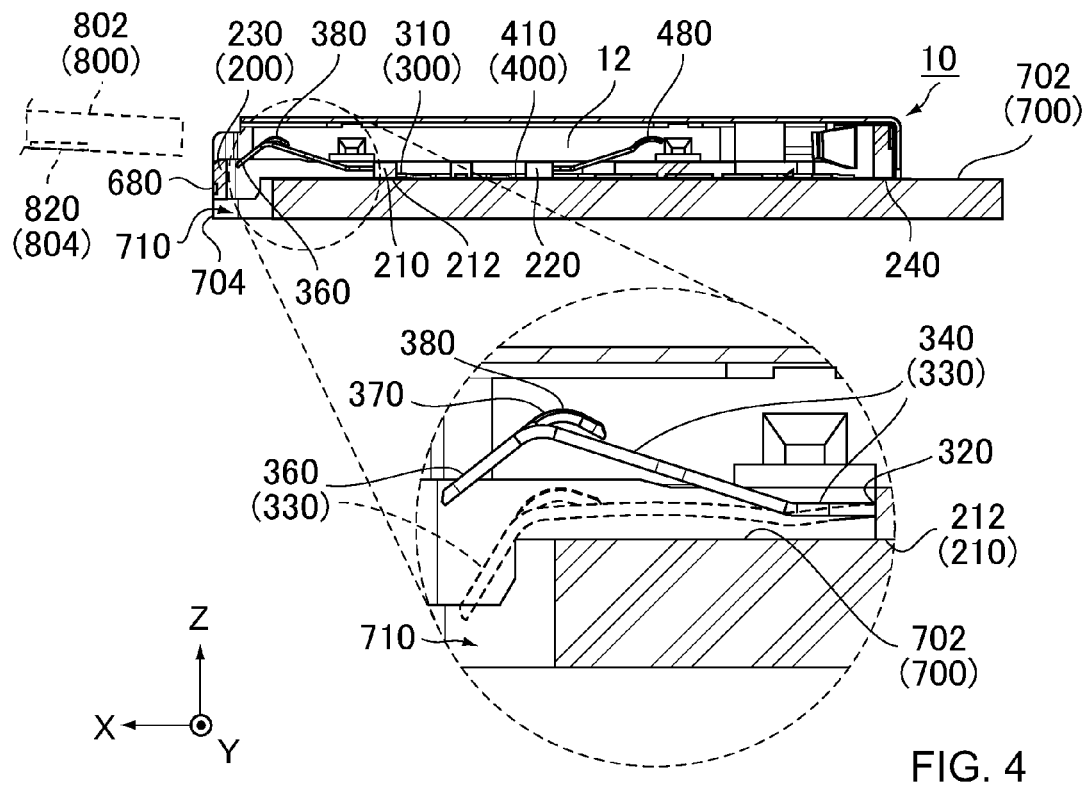
FIG. 4 is a cross-sectional view showing the connector of FIG. 3, taken along line IV-IV, wherein an outline of an end of a card before insertion is illustrated by dotted line, the vicinity of a spring portion of a first contact (contact) of the connector, or a part enclosed by dotted line, is enlarged to be illustrated, and an outline of the contact during the insertion of the card is illustrated by dotted line in the enlarged view.
Figure 5:
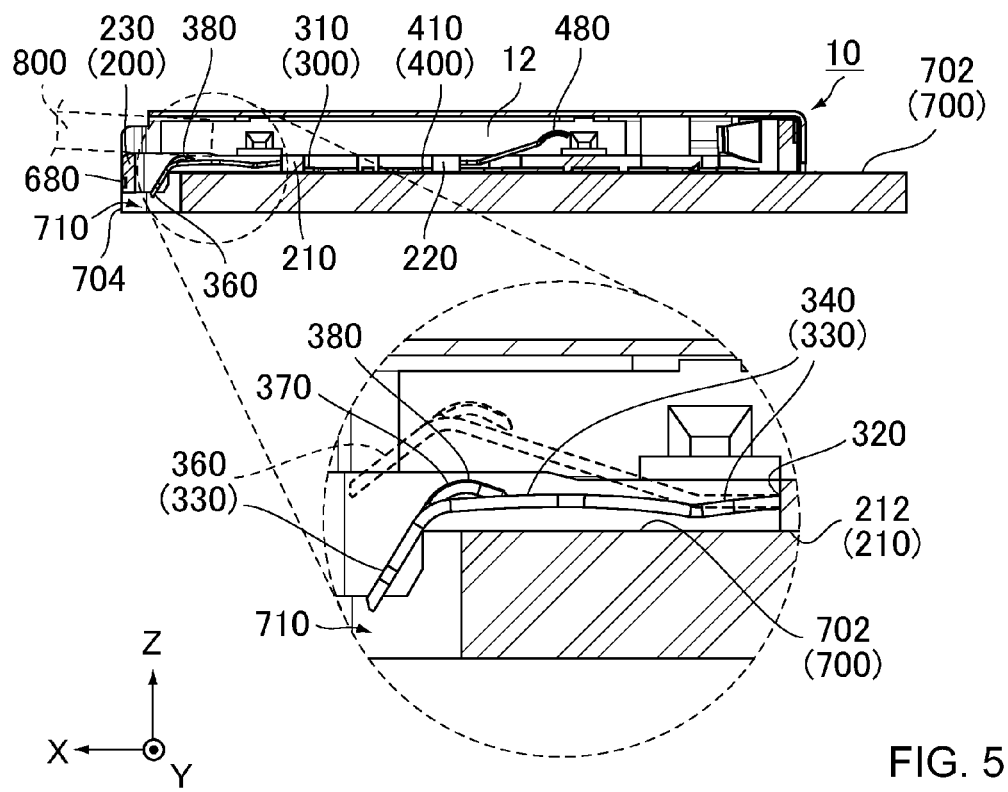
FIG. 5 is a cross-sectional view showing the connector of FIG. 4 under a state where the card is inserted, wherein the outline of the end of the card during the insertion is illustrated by dotted line, the vicinity of the spring portion of the contact of the connector, or a part enclosed by dotted line, is enlarged to be illustrated, and the outline of the contact before the insertion of the card is illustrated by dotted line in the enlarged view.

As can be seen from FIGS. 4 and 5, the connector 10 is connectable to a card 800 inserted rearward thereinto along the front-rear direction. The card 800 according to the present embodiment is a nano SIM card (see FIG. 7). However, the present invention is applicable to a connector which is to be connected to a card other than the nano SIM card. Moreover, the present invention is applicable to a connector which is to be connected to a card held by a card holding member such as a card adapter.

Figure 7:
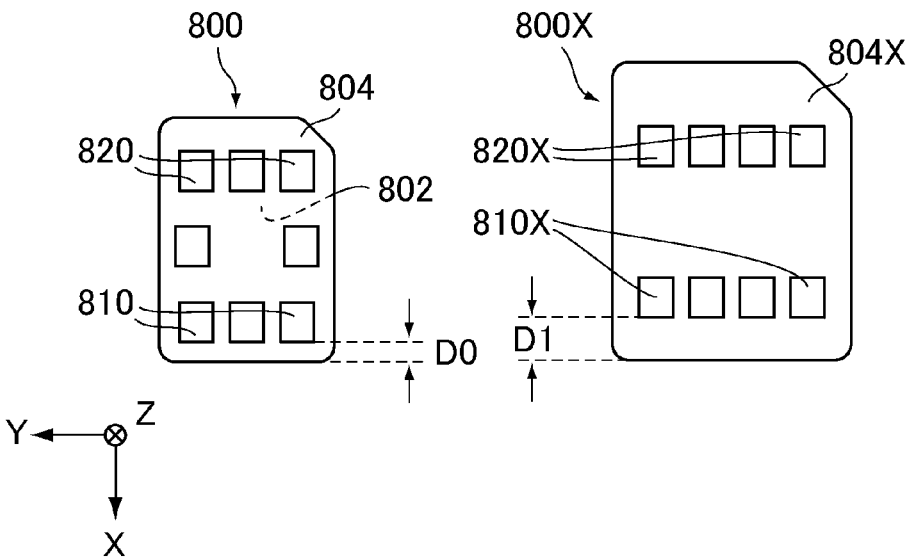
FIG. 7 is a bottom view showing a nano SIM card to be inserted into the connector of FIG. 1 and showing a micro SIM card larger than the nano SIM card.

As shown in FIG. 7, the card 800 according to the present embodiment has an upper surface 802 and a lower surface 804 in the Z-direction. The lower surface 804 is provided with three first electrodes 810 arranged in a width direction (Y-direction) and three second electrodes 820 arranged in the Y-direction. The first electrodes 810 are located on the positive X-side of the lower surface 804 while the second electrodes 820 are located on the negative X-side of the lower surface 804.

A card 800X (micro SIM card) has a structure similar to that of the card 800. However, the card 800X is larger than the card 800. In detail, the card 800X has a lower surface 804X in the Z-direction. The lower surface 804X is provided with four first electrodes 81 OX arranged in the Y-direction and four second electrodes 820X arranged in the Y-direction. The first electrodes 81 OX are located on the positive X-side of the lower surface 804X while the second electrodes 820X are located on the negative X-side of the lower surface 804X.

A distance (D0) between the positive X-side end of the card 800 and each of the first electrodes 810 is smaller than another distance (D1) between the positive X-side end of the card 800X and each of the first electrodes 810X. As described below, the connector 10 (see FIG. 4) according to the present invention is adaptable to be connected to the card 800 having a small distance such as the distance (D0). However, the present invention is also applicable, for example, to a connector which is connected to the card 800X.

As shown in FIGS. 1 to 3, the connector 10 according to the present embodiment comprises a housing 200 made of an insulator, three or a plurality of first contacts (contacts) 300 each made of a conductor, three or a plurality of second contacts 400 each made of a conductor, a cover 500 made of a conductor, two side plates 550 each made of a conductor, a slider 610, a coil spring 620, a cam pin 630, a detection switch 650 made of a conductor and a strengthening member 680 made of a metal.

As shown in FIG. 2, the side plates 550 are located at opposite sides of the housing 200 in the Y-direction, respectively. As shown in FIG. 1, the cover 500 is attached to the housing 200 and the side plates 550 so as to form an accommodation portion 12 inside of the connector 10. The accommodation portion 12 opens at a front end (the positive X-side end) of the connector 10.

Figure 8:
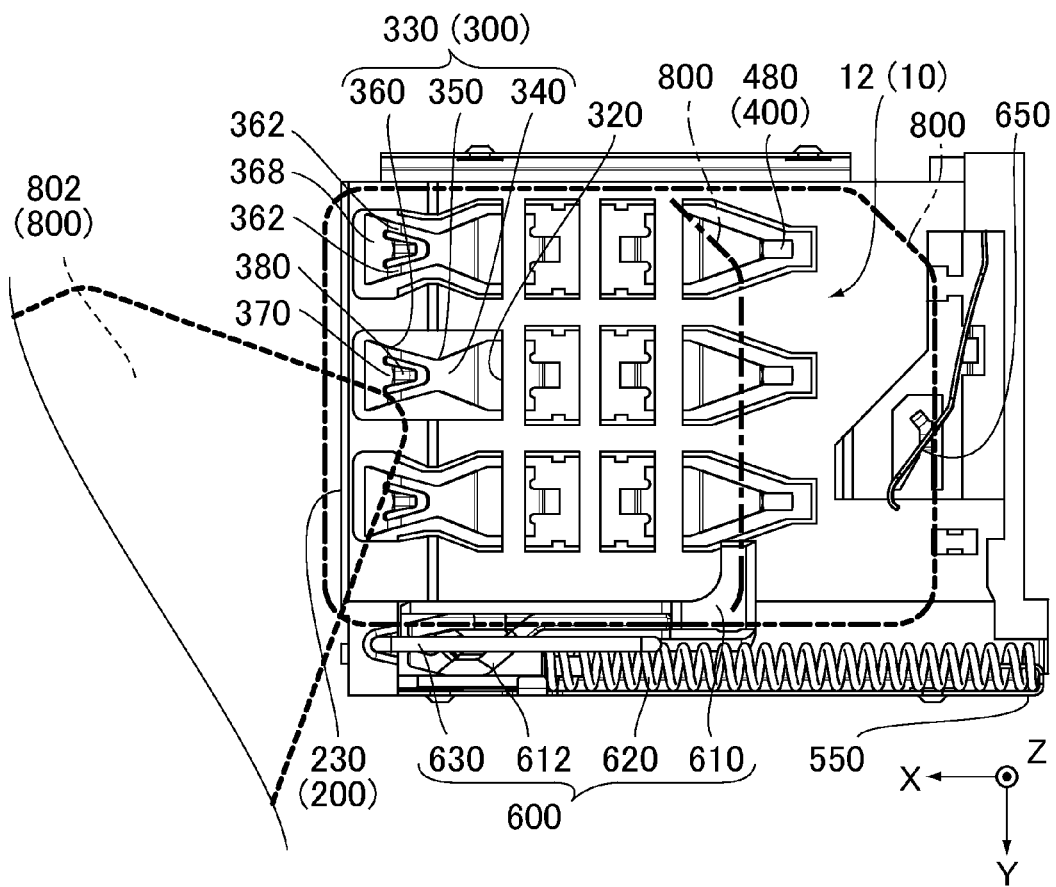
FIG. 8 is a top view showing the connector of FIG. 2, wherein the circuit board is not illustrated, the outline of the end of the card, which starts to be inserted under an inclined state, is illustrated by dotted line, the outline of the end of the card during the insertion is illustrated by chain dotted line, and the outline of the card accommodated in an accommodation portion of the connector is illustrated by two-dot chain line.

As can be seen from FIGS. 2 and 8, the detection switch 650 is located in the vicinity of a rear end (the negative X-side end) of the housing 200. The detection switch 650 according to the present embodiment is a switch of normally opened type and is turned on when the card 800 is accommodated in the accommodation portion 12. However, the detection switch 650 may be a switch of normally closed type. Moreover, the connector 10 may not comprise the detection switch 650.

As shown in FIG. 1, the cover 500 has a plurality of holddowns 510. Each of the holddowns 510 has a predetermined portion (lower end) 512. When the connector 10 is attached to the circuit board 700, the lower ends 512 are fixed to the fixing portions 720 of the circuit board 700, for example, by soldering. As a result, the lower ends 512 of the holddowns 510 are located at a position same as that of the upper surface 702 of the circuit board 700 in the Z-direction.

As shown in FIG. 2, the housing 200 has three first holders 210 arranged in the Y-direction, three second holders 220 arranged in the Y-direction and a predetermined portion (lower end) 240. The first holders 210 are located forward of the second holders 220. The first holders 210 hold the contacts 300, respectively, and the second holders 220 hold the second contacts 400, respectively. Each of the first holders 210 has a predetermined portion (lower end) 212 (see FIG. 4). When the connector 10 is attached to the circuit board 700, the lower end 240 and the lower ends 212 are located at the position same as that of the upper surface 702 of the circuit board 700 in the Z-direction.

Figure 9:
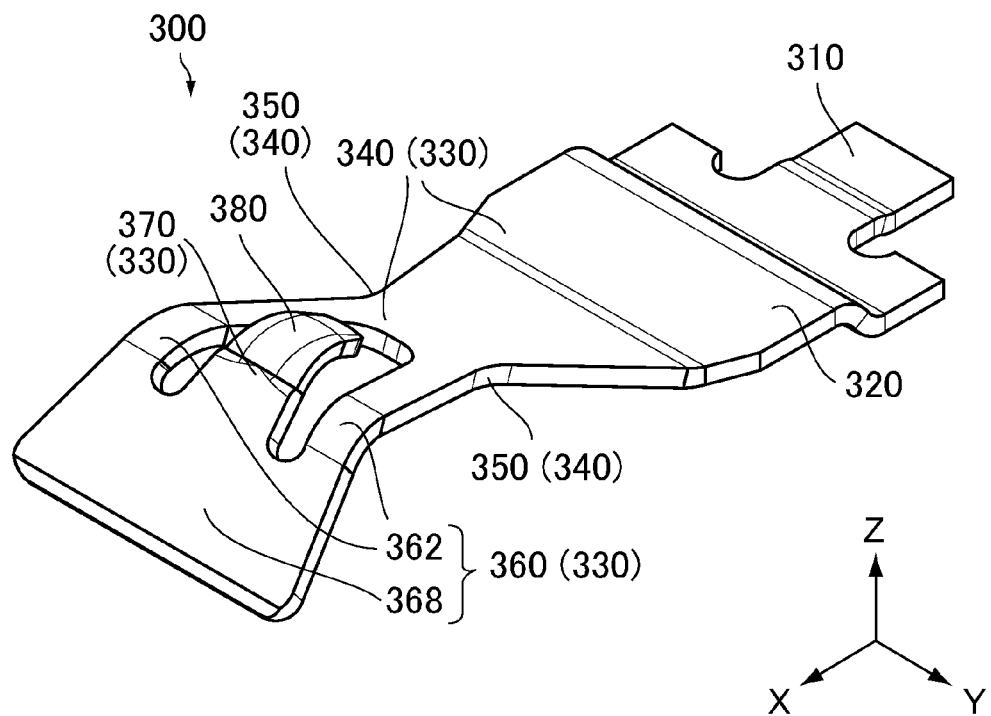
FIG. 9 is a perspective view showing the contact of the connector of FIG. 1.
Figure 10:
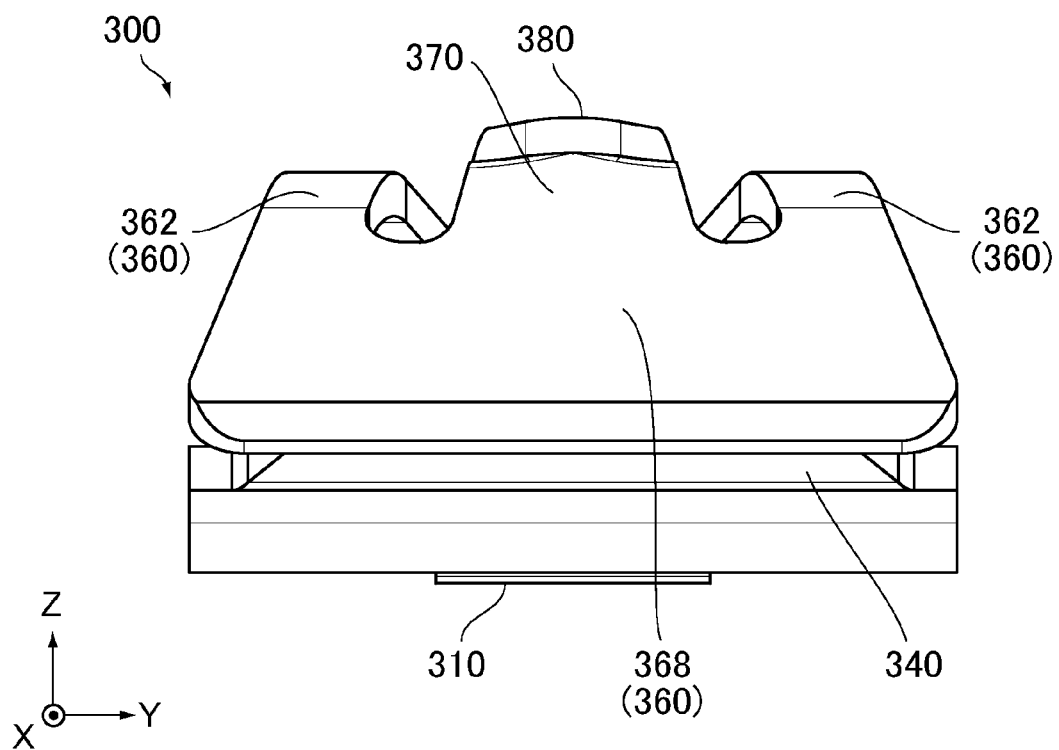
FIG. 10 is a front view showing the contact of FIG. 9.

As shown in FIGS. 2 and 9, each of the contacts 300 has a fixed portion 310, a held portion 320 and a spring portion 330. Each of the spring portions 330 is provided with a contact portion 380. The held portions 320 are held by the first holders 210, respectively. Thus, the contacts 300 are arranged in the Y-direction to form a contact row.

As can be seen from FIG. 2, according to the present embodiment, the held portion 320 of the contact 300 is embedded in the first holder 210 of the housing 200 via insert-molding. However, the contact 300 may not be insert-molded, provided that the held portion 320 is held by the housing 200. For example, the held portion 320 may be press-fit into the first holder 210.

As shown in FIGS. 2 and 9, the fixed portion 310 extends rearward from the held portion 320. When the connector 10 is attached to the circuit board 700, the fixed portion 310 is fixed to the fixing portion 720 of the circuit board 700, for example, by soldering. The spring portion 330 extends forward (in the positive X-direction) from the held portion 320. Thus, the contact portion 380 is located forward of the held portion 320 in the X-direction. The spring portion 330 is supported by the held portion 320 in a cantilever style. The spring portion 330 is resiliently deformable in the Z-direction so that the contact portion 380 is movable in the Z-direction.

As shown in FIG. 2, the second contact 400 has a shape different from that of the contact 300, but has a basic structure similar to that of the contact 300. In detail, each of the second contacts 400 has a fixed portion 410, a held portion 420 and a spring portion 430. Each of the spring portions 430 is provided with a contact portion 480. The held portions 420 are held by the second holders 220, respectively. Thus, the second contacts 400 are arranged in the Y-direction. The fixed portion 410 extends forward from the held portion 420. When the connector 10 is attached to the circuit board 700, the fixed portion 410 is fixed to the fixing portion 720 of the circuit board 700, for example, by soldering. The spring portion 430 extends rearward from the held portion 420. The spring portion 430 is supported to be resiliently deformable in the Z-direction so that the contact portion 480 is movable in the Z-direction.

As shown in FIGS. 2 and 8, the connector 10 according to the present embodiment has a push-push mechanism 600. The push-push mechanism 600 according to the present embodiment is mainly formed of the slider 610, a cam ditch 612, the coil spring 620 and the cam pin 630. The slider 610 is supported by the housing 200 so as to be slidable in the X-direction. The cam ditch 612 is formed on the slider 610. The coil spring 620 has a rear end and a front end, wherein the rear end is supported by the side plate 550, and the front end pushes the slider 610 forward. The cam pin 630 has a rear end and a front end, wherein the rear end is received in the cam ditch 612, and the front end is supported by the housing 200 so that the rear end is movable in the cam ditch 612.

As can be seen from FIG. 8, the contact portions 380 of the contacts 300 and the contact portions 480 of the second contacts 400 are brought into contact with the card 800 under an accommodating state where the card 800 is inserted in the connector 10 and accommodated in the accommodation portion 12. In detail, the card 800 is inserted into the accommodation portion 12 of the connector 10 while resisting a pushing force of the coil spring 620 to slide the slider 610 rearward. When the card 800 is accommodated in the accommodation portion 12, the first electrodes 810 (see FIG. 7) of the card 800 are brought into contact with the contact portions 380 of the contacts 300, respectively, while the second electrodes 820 (see FIG. 7) are brought into contact with the contact portions 480 of the second contacts 400, respectively. In other words, the card 800 is electrically connected with the connector 10. Under the accommodating state, the front end of the cam pin 630 is held at a predetermined position in the cam ditch 612. Accordingly, the card 800 is kept to be accommodated in the accommodation portion 12.

When the card 800 under the accommodating state is temporally pushed rearward, the push-push mechanism 600 ejects the card 800. In detail, when the card 800 is pushed rearward, the slider 610 is slid a little rearward together with the card 800. As a result, the rear end of the cam pin 630 is apart from the predetermined position in the cam ditch 612 to become movable in the cam ditch 612. When the card 800 is released from being pushed, the slider 610 is slid forward by the pushing force of the coil spring 620 to eject the card 800.

Hereafter, explanation is made further in detail about the connector 10 formed as described above, wherein the explanation is mainly made about a structure and a function of the contact 300.

As shown in FIGS. 9 to 12, the spring portion 330 of the contact 300 has a bent portion 340 and a guide portion 360.

As shown in FIG. 4, the bent portion 340 extends forward from the held portion 320 in parallel with the XY-plane, and subsequently extends forward while sloping upward (in the positive Z-direction). The most part of the bent portion 340 is located between the held portion 320 and the contact portion 380 in the X-direction. However, a front end of the bent portion 340 is located forward of the contact portion 380 and located below the contact portion 380 in the Z-direction. Because the bent portion 340 is thus formed, the first electrode 810 (see FIG. 7) of the card 800 is not brought into contact with the spring portion 330 except the contact portion 380. Since the spring portion 330 is brought into contact with the first electrode 810 only at the contact portion 380, the contact portion 380 has a stable contact force. Moreover, the thus-formed bent portion 340 allows the spring portion 330 to have longer spring length.

As shown in FIGS. 4 and 5, the guide portion 360 is located forward of the contact portion 380 in the X-direction. The guide portion 360 extends forward while sloping downward (in the negative Z-direction). Moreover, the housing 200 holds the contact 300 only by the held portion 320, and the guide portion 360 is movable in the Z-direction. When the card 800 is inserted into the connector 10, the end of the card 800 is brought into abutment with the guide portion 360.

Since the guide portion 360 is formed as described above, the guide portion 360 is moved downward when being brought into abutment with the card 800. Accordingly, the guide portion 360 (the contact 300) is prevented from being buckled.

In particular, according to the present embodiment, the guide portion 360 is located over the cut 710 of the circuit board 700 (see FIG. 4) under an attached state where the connector 10 is mounted on and attached to the circuit board 700. When the card 800 is inserted into the connector 10 under the attached state, the most part, or a part, of the guide portion 360 is moved into the cut 710 from outside of the cut 710 (see FIG. 5).

As previously described, the distance (D0) between the positive X-side end (the rear end) of the card 800 and the first electrode 810 is smaller even than that of the micro SIM card, or the card 800X (see FIG. 7). Accordingly, in order for the connector 10 to be reduced in size, the position of the contact portion 380 needs to be nearer to the opening of the accommodation portion 12. However, if the guide portion 360 is located over the upper surface 702 of the circuit board 700, the guide portion 360 might be brought into contact with the upper surface 702 when being moved downward. Accordingly, the contact force of the contact portion 380 might become unstable. In order to prevent the guide portion 360 from being brought into contact with the upper surface 702, it is necessary to make the length of the guide portion 360 shorter as the contact portion 380 is nearer to the opening of the accommodation portion 12. As can be seen from the above explanation, if the guide portion 360 is located over the upper surface 702, the guide portion 360 is unable to have sufficient length. In contrast, according to the present embodiment, a space, within which the guide portion 360 is moved, can be expanded downward beyond the upper surface 702 of the circuit board 700. Accordingly, the contact 300 can be provided with the guide portion 360 having sufficient length while the connector 10 is reduced in size. Moreover, by making the length of the guide portion 360 longer, a length of the whole of the spring portion 330 can be made longer. Accordingly, the spring portion 330 can be made more easily resiliently deformable.

In particular, the connector 10 according to the present embodiment ejects the card 800 by using the push-push mechanism 600 (see FIG. 8). Upon ejection of the card 800, the card 800 needs to be moved rearward. In order for the card 800 to be operable to be moved rearward, the positive X-side end of the card 800 projects forward from the opening of the accommodation portion 12 (see the outline of two-dot chain line in FIG. 8) under the accommodating state where the card 800 is accommodated in the accommodation portion 12 of the connector 10. The first electrode 810 (see FIG. 7) of the card 800 is nearer to the opening of the accommodation portion 12 by the projecting amount of the card 800. Accordingly, the contact portion 380 needs to be nearer to the opening of the accommodation portion 12. As can be seen from the above explanation, the present invention is particularly effective to the connector 10 having the push-push mechanism 600. However, the present invention is also applicable to a connector not having the push-push mechanism 600.

As shown in FIGS. 1, 2 and 4, under the attached state, the lower ends (predetermined portions) 512 of the holddowns 510, the lower end (predetermined portion) 240 of the housing 200 and the lower ends (predetermined portions) 212 of the first holders 210 are located at the same position as the upper surface 702 of the circuit board 700 in the Z-direction. Accordingly, the guide portion 360 is moved downward beyond the lower ends 512, the lower end 240 and the lower ends 212 when being moved downward beyond the upper surface 702. In detail, during an insertion of the card 800 under the attached state, the guide portion 360 is moved downward without being brought into contact with any part of the connector 10 and the circuit board 700. Under the accommodating state, at least a part of the guide portion 360 is located below the predetermined portions 512, the predetermined portion 240 and the predetermined portions 212, or below the upper surface 702, in the Z-direction. The circuit board 700 may be provided with no cut 710, provided that the guide portion 360 is thus formed. For example, the connector 10 may be attached to the circuit board 700 so that a front end of the guide portion 360 is located forward of the front end 704 of the circuit board 700. However, when the connector 10 is thus attached to the circuit board 700, a distance between the front end of the cover 500 and the holddown 510 becomes larger so that the connector 10 becomes to be easily swayed. Accordingly, the present embodiment is more preferable in order to more securely fix the connector 10 to the circuit board 700.

According to the present embodiment, each of the lower ends 512 of the holddowns 510, the lower end 240 of the housing 200 and the lower ends 212 of the first holders 210 functions as the predetermined portion to be located at the same position as the upper surface 702 of the circuit board 700 under the attached state. However, the predetermined portion may be any part of the connector 10, provide that the part is located at the same position as the upper surface 702 under the attached state. For example, only one of the lower ends 512, 240 and 212 may be the predetermined portion.

As shown in FIGS. 2, 4 and 5, the housing 200 according to the present embodiment has a protector 230. The protector 230 is located forward of the guide portions 360. In detail, when the card 800 is not inserted in the connector 10, a part of the protector 230 is located forward of the front ends of the guide portions 360 in the X-direction and located at a position same as those of the front ends of the guide portions 360 in the Z-direction. Moreover, when the card 800 is not inserted in the connector 10, an upper end (the positive Z-side end) of the protector 230 is located at a position roughly same as those of the front ends of the guide portions 360 in the Z-direction. In detail, the upper end of the protector 230 according to the present embodiment is located slightly above the front ends of the guide portions 360. Because the connector 10 according to the present embodiment comprises the thus-formed protector 230, the guide portion 360 can be prevented from being buckled by the card 800 which is brought into abutment with the front end of the guide portion 360 when the card 800 is inserted into the connector 10. Moreover, the spring portion 330 can be prevented from being bent upward by the card 800.

The protector 230 according to the present embodiment is a part of the housing 200. However, the protector 230 may be a member other than the housing 200. The protector 230 according to the present embodiment is strengthened by the strengthening member 680 made of a metal. However, the strengthening member 680 may not be provided, provided that the protector 230 has sufficient strength. The strengthening member 680 according to the present embodiment extends linearly in the Y-direction from the vicinity of one of ends of the protector 230 to the vicinity of a remaining one of the ends (see FIG. 2). However, the strengthening member 680 may be provided differently, provided that the protector 230 has sufficient strength. Moreover, the strengthening member 680 may not be made of a metal.

As shown in FIGS. 9 to 12, the contact 300 according to the present embodiment has a beam 370. The guide portion 360 of the contact 300 has two outer sections 362 and a middle section (beam support portion) 368. The outer sections 362 are located at opposite sides of the guide portion 360 in the Y-direction, respectively. The beam support portion 368 is located at the middle of the guide portion 360 in the Y-direction to couple the outer sections 362 with each other in the Y-direction. The beam 370 is supported by the beam support portion 368 in a cantilever style. In detail, the beam 370 extends rearward from the beam support portion 368 while being curved to have protruding portion which protrudes upward. The contact portion 380 according to the present embodiment is provided on the beam 370. In detail, the contact portion 380 is located at an upper end of the protruding portion of the beam 370. Because amount of resilient deformation of the beam 370 is small (see FIGS. 4 and 5), the position of the contact portion 380 is clear.

Figure 11:
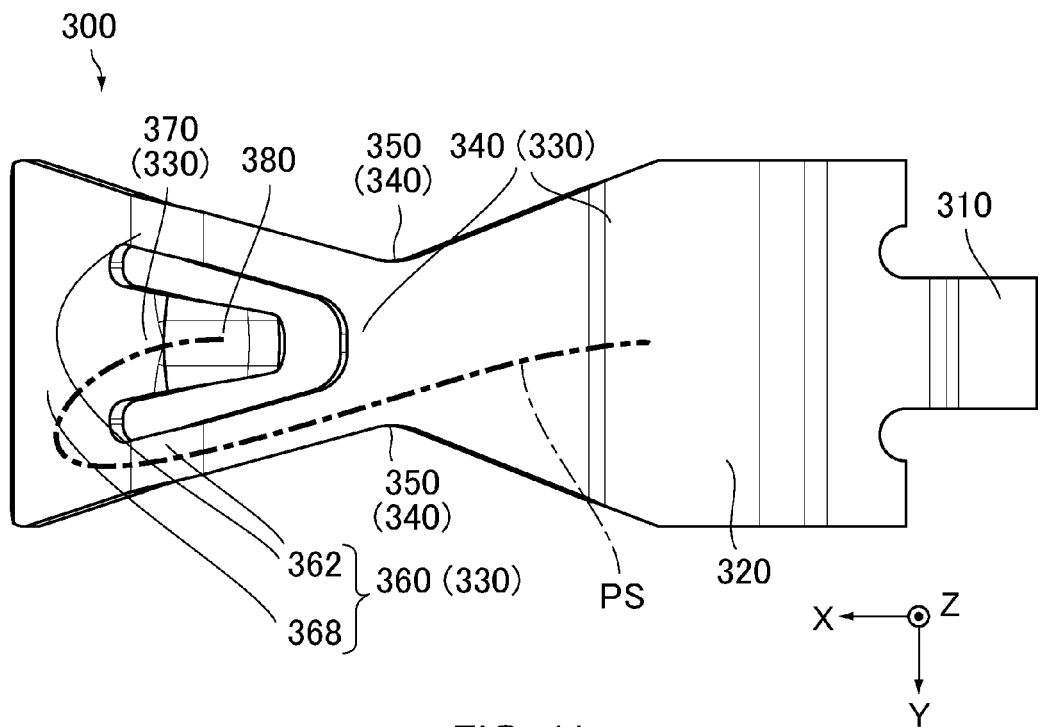
FIG. 11 is a top view showing the contact of FIG. 9.

As shown in FIG. 11, since the spring portion 330 of the contact 300 has the beam 370 that is formed as described above, its spring length can be made longer, wherein the spring length is a length of a section which functions as a spring and which is located between the front end of the held portion 320 and the contact portion 380. More specifically, according to the present embodiment, although the guide portion 360 is hardly resiliently deformed, a length of a spring path PS, or the spring length, is longer than a distance between the front end of the held portion 320 and the contact portion 380 in the X-direction. Moreover, since the contact portion 380 is near to the held portion 320, the contact portion 380 is not largely moved in the Y-direction even when the spring portion 330 receives a force in the Y-direction.

Figure 12:
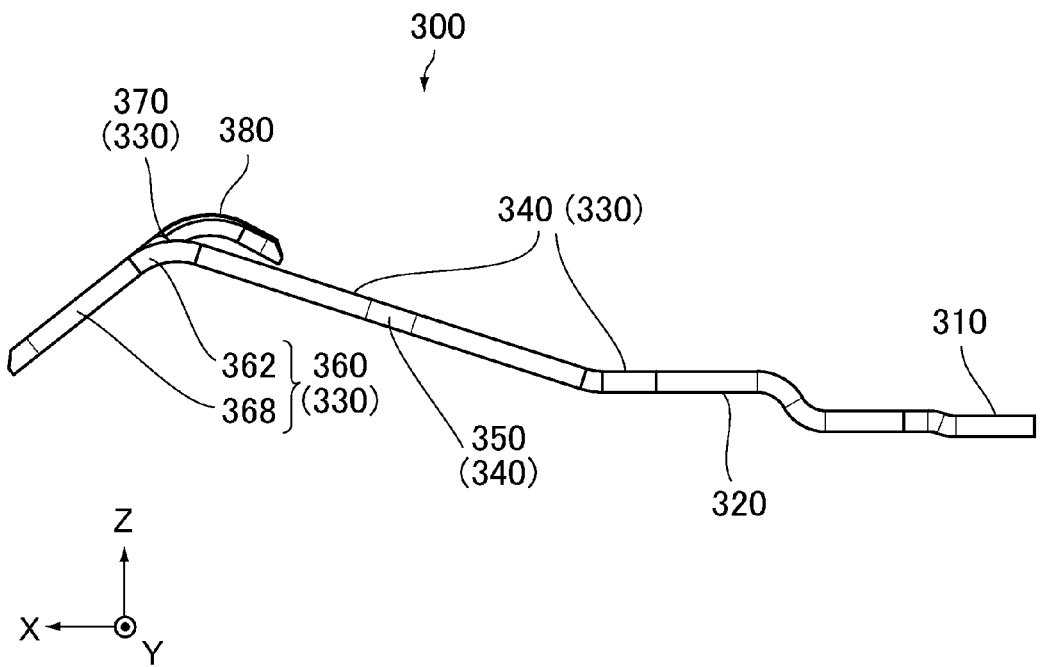
FIG. 12 is a side view showing the contact of FIG. 9.

As shown in FIGS. 9, 11 and 12, the spring portion 330 of the contact 300 according to the present embodiment has a narrow portion 350. The narrow portion 350 according to the present embodiment is formed at the bent portion 340. The contact 300 is made narrow at the narrow portion 350. In detail, the contact 300 (the spring portion 330) has a width, or a size in the Y-direction, wherein the size at a part of the contact 300 (the spring portion 330) becomes smaller as the part approaches the narrow portion 350 away from each of a part located forward of the narrow portion 350 and another part located rearward of the narrow portion 350. In other words, the spring portion 330 has a front portion (the positive X-side portion) and a rear portion (the negative X-side portion) in addition to the narrow portion 350, wherein the front portion is positioned forward of the narrow portion 350 in the X-direction, and the rear portion is positioned rearward of the narrow portion 350 in the X-direction. In the Y-direction, the spring portion 330 has a shape with decreased sizes from the front portion to the narrow portion 350 and with decreased sizes from the rear portion to the narrow portion 350. In other words, the rear portion of the spring portion 330 becomes narrower as approaching from the held portion 320 toward the narrow portion 350, and the front portion of the spring portion 330 becomes wider as approaching from the narrow portion 350 toward the front end of the guide portion 360.

As can be seen from FIG. 8, since the rear portion of the spring portion 330 is formed as described above, a stress generated at a boundary between the held portion 320 and the spring portion 330 upon the movement of the guide portion 360 is dispersed so that the contact 300 can be prevented from being damaged. Moreover, the length of the spring portion 330 can be made relatively short while spring property of the spring portion 330 is kept. Thus, the whole length of the spring portion 330 in the X-direction between the front end of the held portion 320 and the front end of the guide portion 360 can be made shorter (see FIGS. 11 and 12).

Since the front portion of the spring portion 330 is formed as described above, the end of the card 800 is smoothly slidable on the guide portion 360 even when the card 800 is inserted into the connector 10 in a state where the card 800 is obliquely inclined relative to the connector 10. Accordingly, the guide portion 360 can be prevented from being pushed by the card 800 to be moved largely in the Y-direction. Moreover, since the front end of the guide portion 360 is wide, the guide portion 360 is resistant to a force in the Y-direction. In other words, the contact 300 according to the present embodiment has high stiffness in the Y-direction.

As can be seen from the above explanation, by provision of the spring portion 330 with the narrow portion 350, it is possible to obtain the contact 300 which is relatively short and which is more adaptable to the oblique insertion of the card 800.

As described below, the connector 10 according to the present embodiment can be modified variously.

Figure 13:
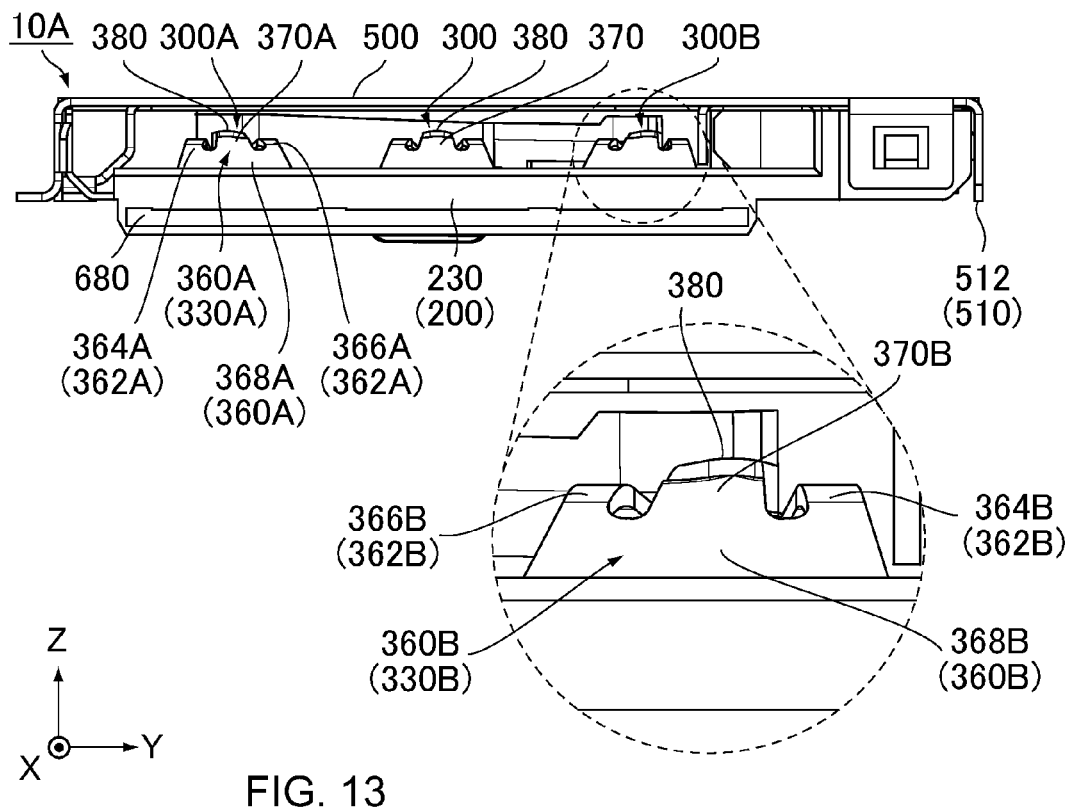
FIG. 13 is a front view showing a modification of the contact of FIG. 1, wherein the circuit board is not illustrated, and the vicinity of the contact located at an end of a contact row, or a part enclosed by dotted line, is enlarged to be illustrated.
Figure 14:
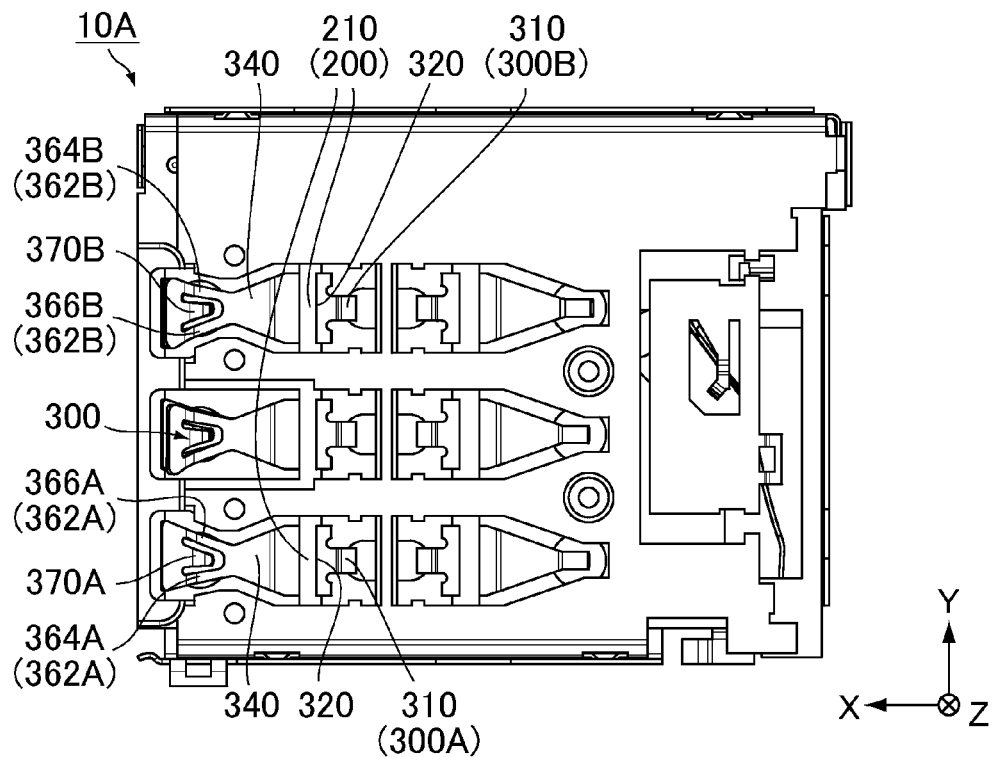
FIG. 14 is a bottom view showing the connector of FIG. 13.

As shown in FIGS. 13 and 14, a connector 10A according to a modification comprises one first contact (contact) 300A and one first contact (contact) 300B instead of two outer contacts 300 among the three contacts 300 (see FIG. 2). The contact 300A, the contact 300 and the contact 300B are held by the first holders 210 of the housing 200, respectively, similar to the contacts 300 of the connector 10 (see FIG. 2). The contact 300A, the contact 300 and the contact 300B form a contact row arranged in the Y-direction. The connector 10A has the same structure as the connector 10 except this contact row.

The contact 300A is located at the negative Y-side end of the contact row while the contact 300B is located at the positive Y-side end of the contact row. The contact 300 is located at the middle of the contact row. The contact 300A has the same structure as the contact 300 except a guide portion 360A and a beam 370A of a spring portion 330A. The contact 300B also has the same structure as the contact 300 except a guide portion 360B and a beam 370B of a spring portion 330B.

The guide portion 360A of the contact 300A has two outer sections 362A and a middle section (beam support portion) 368A. The outer sections 362A are located at opposite sides of the guide portion 360A in the Y-direction, respectively. The beam support portion 368A is located at the middle of the guide portion 360A in the Y-direction to couple the outer sections 362A with each other in the Y-direction. The beam 370A is supported by the beam support portion 368A in a cantilever style to extend rearward from the beam support portion 368A while being curved. The contact portion 380 is provided on the beam 370A similar to the contact 300.

Similarly, the guide portion 360B of the contact 300B has two outer sections 362B and a middle section (beam support portion) 368B. The outer sections 362B are located at opposite sides of the guide portion 360B in the Y-direction, respectively. The beam support portion 368B is located at the middle of the guide portion 360B in the Y-direction to couple the outer sections 362B with each other in the Y-direction. The beam 370B is supported by the beam support portion 368B in a cantilever style to extend rearward from the beam support portion 368B while being curved. The contact portion 380 is provided on the beam 370B similar to the contact 300.

The guide portion 360A of the contact 300A has a shape asymmetrical relative to the middle of the guide portion 360A in the Y-direction. In detail, the outer sections 362A are formed of a first outer section 364A and a second outer section 366A. The first outer section 364A is located outside of the guide portion 360A in the Y-direction while the second outer section 366A is located inside of the guide portion 360A in the Y-direction. The first outer section 364A extends slightly inward in the Y-direction while the second outer section 366A extends largely outward in the Y-direction. Moreover, the beam 370A extends outward in the Y-direction.

Similarly, the guide portion 360B of the contact 300B has a shape asymmetrical relative to the middle of the guide portion 360B in the Y-direction. The outer sections 362B are formed of a first outer section 364B and a second outer section 366B. The first outer section 364B is located outside of the guide portion 360B in the Y-direction while the second outer section 366B is located inside of the guide portion 360B in the Y-direction. The first outer section 364B extends slightly inward in the Y-direction while the second outer section 366B extends largely outward in the Y-direction. Moreover, the beam 370B extends outward in the Y-direction.

According to the present modification, each of the second outer section 366A and the second outer section 366B, which are portions tending to be brought into contact with the end of the card 800, extends largely outward in the Y-direction.

Accordingly, the contact row according to the present modification is more adaptable to the oblique insertion (see FIG. 8) of the card 800.

As described below, the contact 300 according to the present embodiment can be further modified variously.

Figure 15:
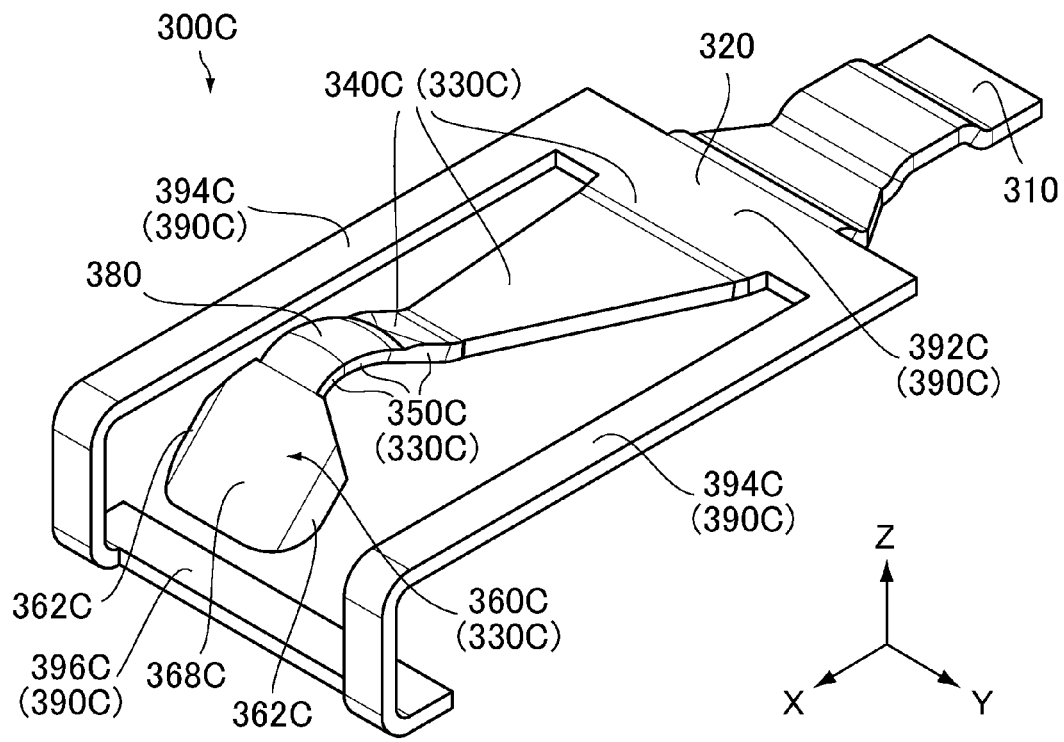
FIG. 15 is a perspective view showing a modification of the contact of FIG. 9.
Figure 16:
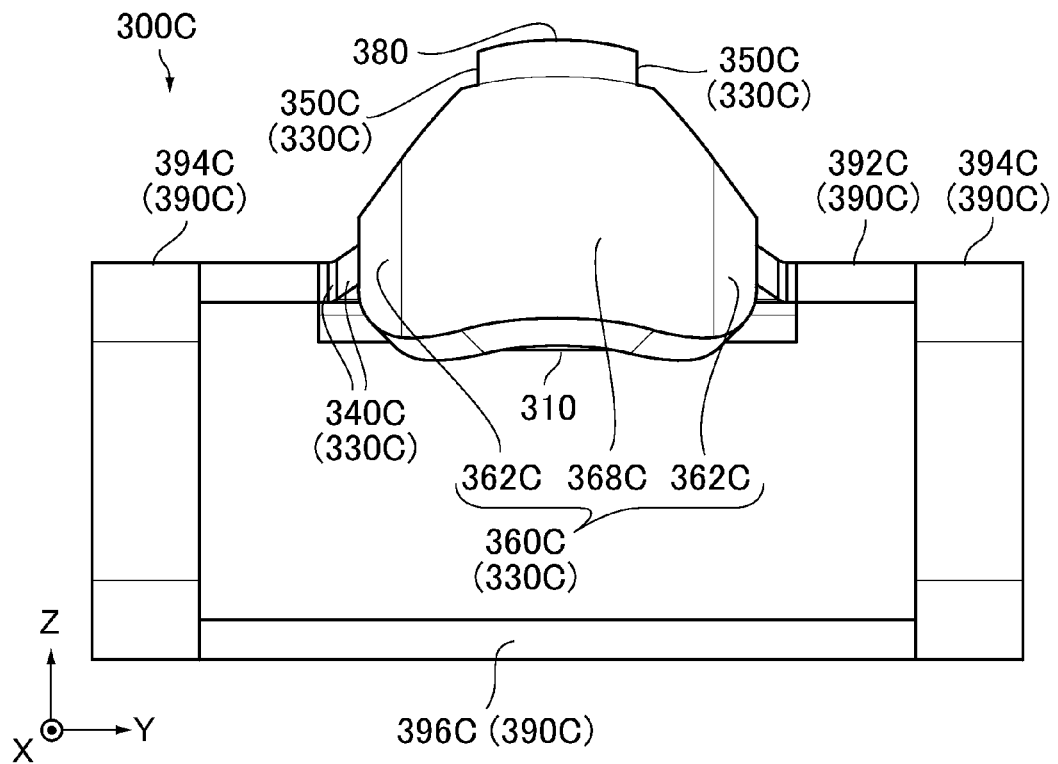
FIG. 16 is a front view showing the contact of FIG. 15.
Figure 17:
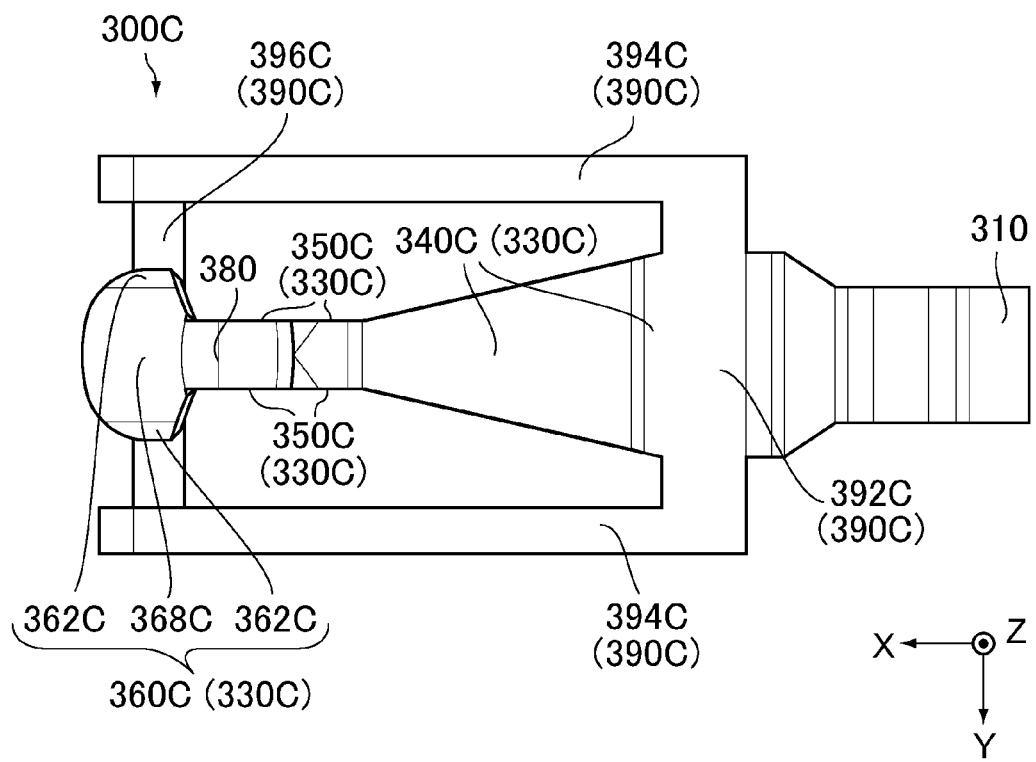
FIG. 17 is a top view showing the contact of FIG. 15.
Figure 18:
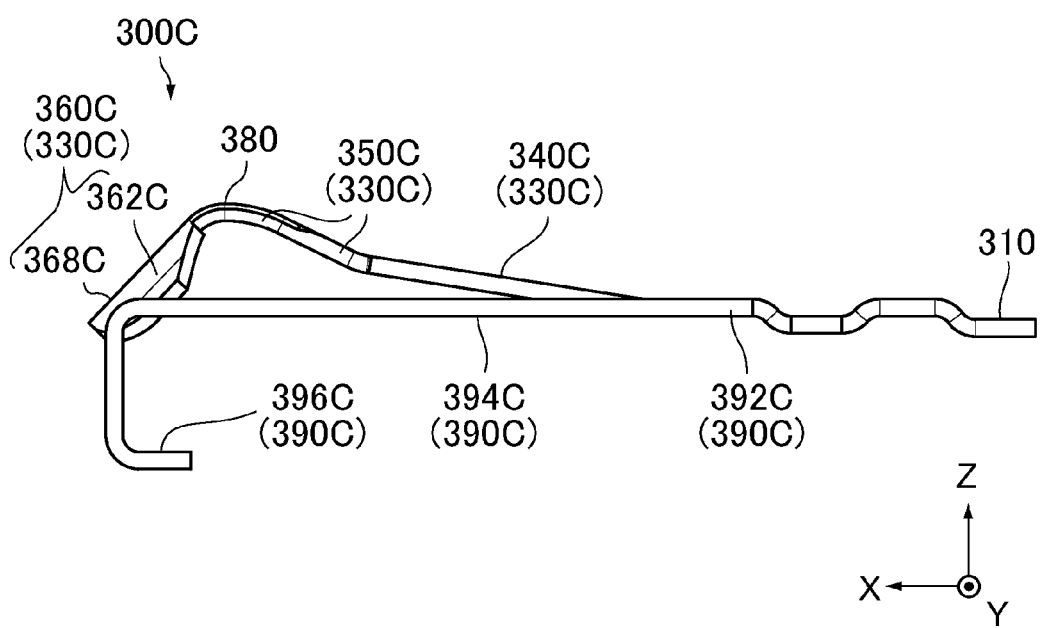
FIG. 18 is a side view showing the contact of FIG. 15.
Figure 19:
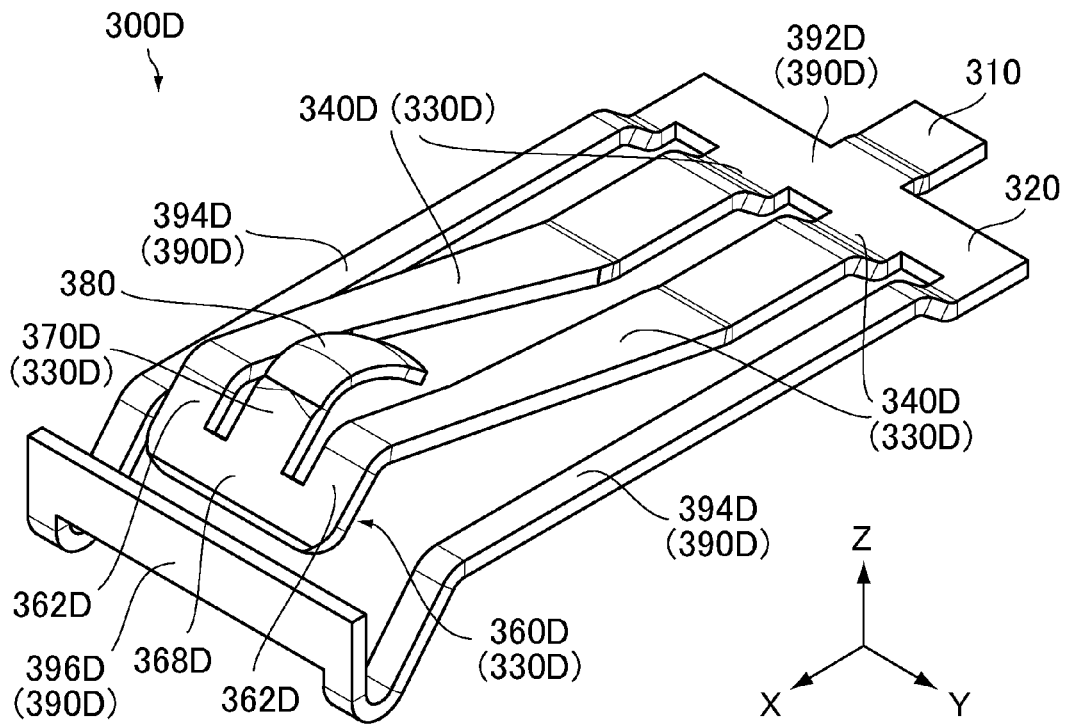
FIG. 19 is a perspective view showing another modification of the contact of FIG. 9.
Figure 20:
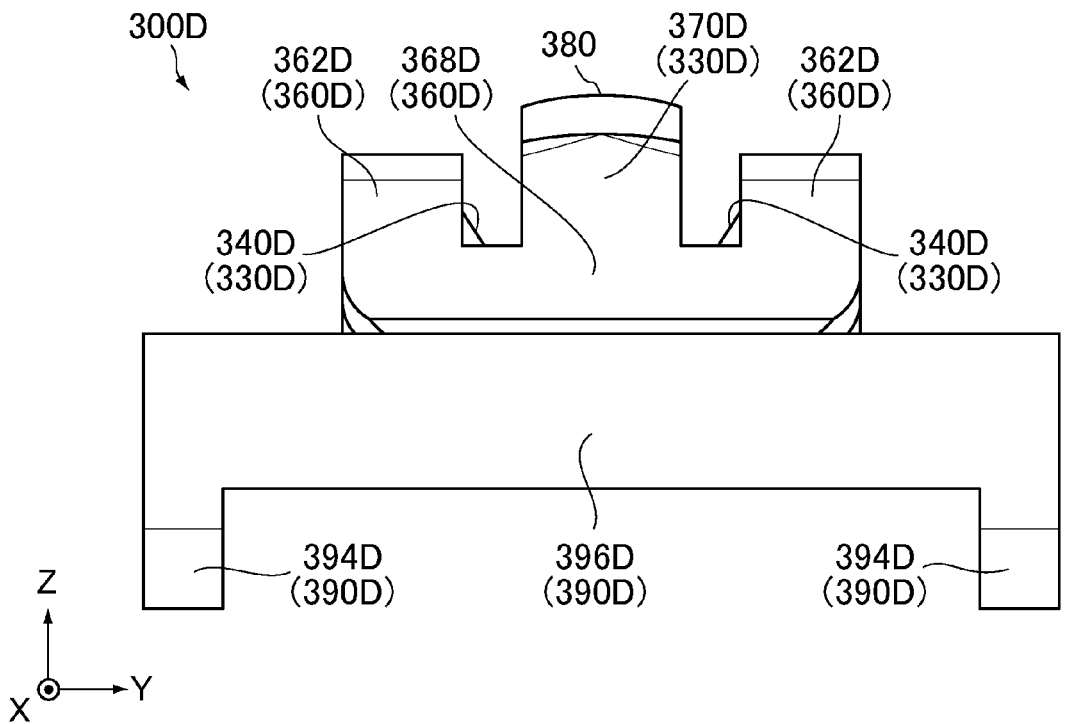
FIG. 20 is a front view showing the contact of FIG. 19.
Figure 21:
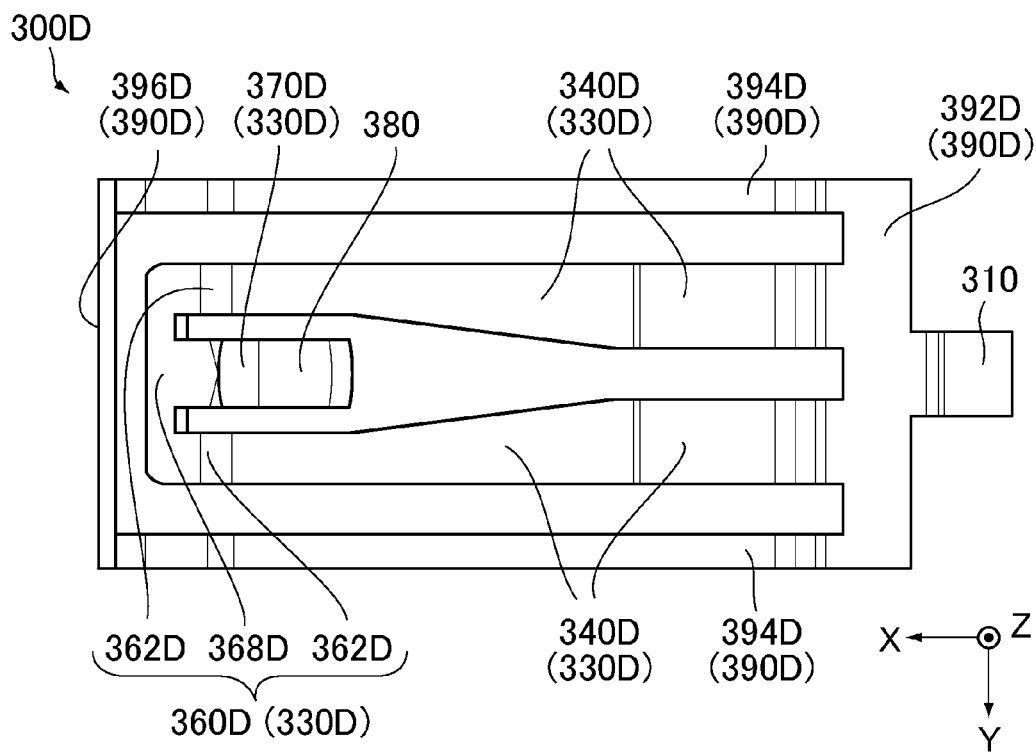
FIG. 21 is a top view showing the contact of FIG. 19.
Figure 22:
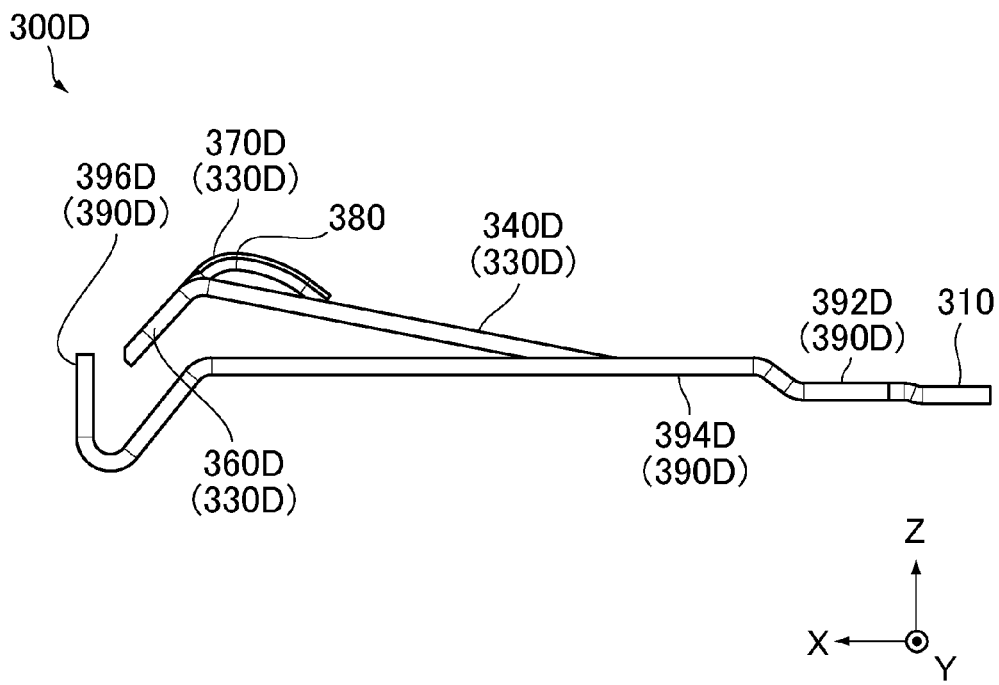
FIG. 22 is a side view showing the contact of FIG. 19.
Figure 23:
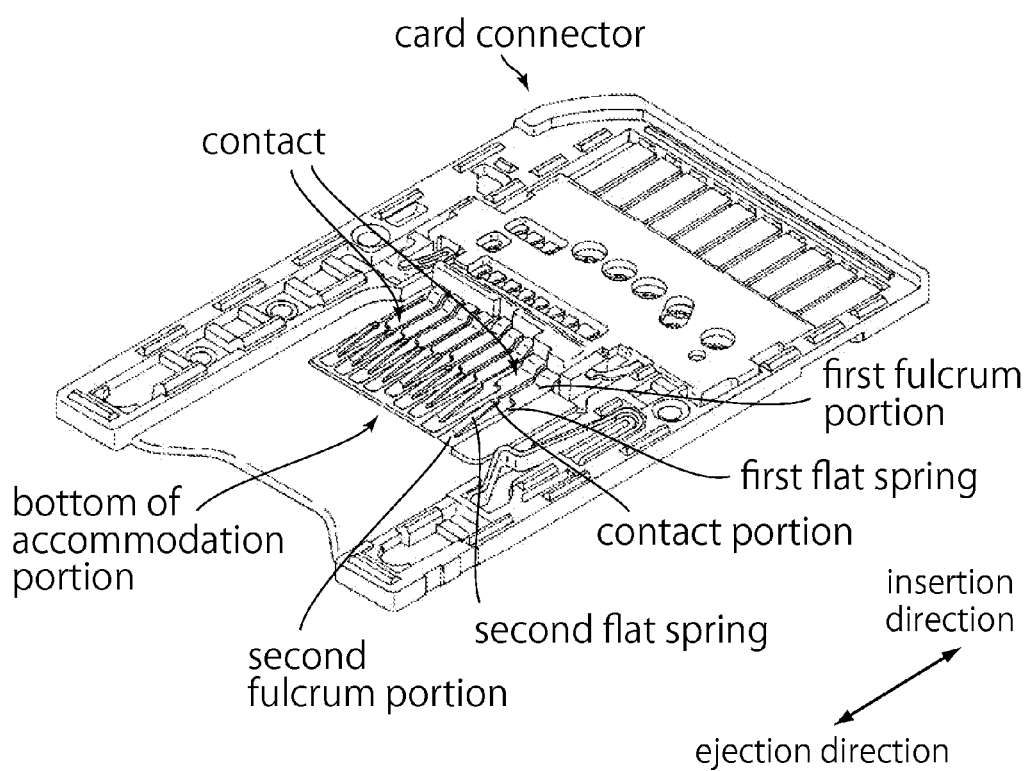
FIG. 23 is a perspective view showing a card connector of Patent Document 1 in a state where an upper case of the card connector is removed.

As shown in FIGS. 15 and 19, each of first contact (contact) 300C and first contact (contact) 300D according to another modification has a fixed portion 310 and a held portion 320 similar to the contact 300 (see FIG. 9). The fixed portion 310 is fixed to the fixing portion 720 of the circuit board 700 (see FIG. 2). The housing 200 holds each of the contact 300C and the contact 300D by the held portion 320 (see FIG. 2). Hereafter, explanation is made about portions of the contact 300C and the contact 300D except the fixed portion 310 and the held portion 320.

As shown in FIGS. 15 to 18, the contact 300C according to the modification has a strengthening portion 390C in addition to a spring portion 330C and the contact portion 380. The strengthening portion 390C has a rectangular frame-like shape perpendicular to the Z-direction. In detail, the strengthening portion 390C has a rear coupling portion 392C, two arms 394C and a front coupling portion 396C. The rear coupling portion 392C and the front coupling portion 396C couple the arms 394C with each other in the Y-direction. The rear coupling portion 392C functions as the held portion 320. The spring portion 330C extends forward from the rear coupling portion 392C. The strengthening portion 390C surrounds the spring portion 330C in the XY-plane. The thus-formed strengthening portion 390C strengthens the contact 300C to prevent the spring portion 330C from being deformed in a direction perpendicular to the Z-direction.

The spring portion 330C is resiliently deformable in the Z-direction. In detail, the spring portion 330C has a bent portion 340C, a narrow portion 350C and a guide portion 360C.

The bent portion 340C slightly extends from the rear coupling portion 392C in parallel with the XY-plane, and subsequently extends forward while sloping upward. The bent portion 340C is located between the rear coupling portion 392C and the contact portion 380 in the X-direction. The thus-formed bent portion 340C functions similar to the bent portion 340 (see FIG. 4).

The narrow portion 350C according to the modification includes a front end portion of the bent portion 340C. The narrow portion 350C extends forward while being curved. The narrow portion 350C is formed similar to the narrow portion 350 (see FIG. 8) of the contact 300. In detail, the contact 300C (the spring portion 330C) has a size in the Y-direction, wherein the size at a part of the contact 300C (the spring portion 330C) becomes smaller as the part approaches the narrow portion 350C away from each of a part located forward of the narrow portion 350C and another part located rearward of the narrow portion 350C. The thus-formed narrow portion 350C functions similar to the narrow portion 350.

The guide portion 360C is located forward of the contact portion 380 in the X-direction. The guide portion 360C extends forward while sloping downward. The guide portion 360C has two outer sections 362C and a middle section 368C. The outer sections 362C are located at opposite sides of the guide portion 360C in the Y-direction, respectively. The middle section 368C couples the outer sections 362C with each other in the Y-direction. Similar to the guide portion 360 (see FIG. 4), the thus-formed guide portion 360C prevents the contact 300C from being buckled. In particular, according to the present modification, opposite sides of the middle section 368C in the Y-direction extend obliquely rearward. In addition, the outer sections 362C extend obliquely rearward. Accordingly, even when the card 800 is inserted into the connector 10 in the state where the card 800 is obliquely inclined relative to the connector 10 (see FIG. 8), the guide portion 360C can be more securely prevented from being brought into contact with the card 800 to be moved largely in the Y-direction.

As shown in FIGS. 19 to 22, the contact 300D according to the other modification has a strengthening portion 390D in addition to a spring portion 330D and the contact portion 380. The strengthening portion 390D has a rectangular frame-like shape perpendicular to the Z-direction. In detail, the strengthening portion 390D has a rear coupling portion 392D, two arms 394D and a front coupling portion (protector) 396D. The rear coupling portion 392D and the front coupling portion 396D couple the arms 394D with each other in the Y-direction. The rear coupling portion 392D functions as the held portion 320. The spring portion 330D extends forward from the rear coupling portion 392D. The strengthening portion 390D surrounds the spring portion 330D in the XY-plane. The thus-formed strengthening portion 390D strengthens the contact 300D similar to the strengthening portion 390C (see FIG. 15) of the contact 300C.

The spring portion 330D is resiliently deformable in the Z-direction. In detail, the spring portion 330D has two bent portions 340D, a guide portion 360D and a beam 370D.

The bent portions 340D are arranged in the Y-direction. Each of the bent portions 340D has a rear portion and a front portion, wherein the rear portion is connected to the rear coupling portion 392D, and the front portion is connected to the guide portion 360D. The rear portion of the bent portion 340D has a wide width, or a large size in the Y-direction, while the front portion has a narrow width, or a small size in the Y-direction. The bent portion 340D slightly extends from the rear coupling portion 392D in parallel with the XY-plane, and subsequently extends forward while sloping upward. The most part of the bent portion 340D is located between the rear coupling portion 392D and the contact portion 380 in the X-direction. However, the vicinity of the front end of the bent portion 340D is located forward of the contact portion 380. The thus-formed bent portion 340D functions similar to the bent portion 340 (see FIG. 4).

The guide portion 360D is located forward of the contact portion 380 in the X-direction. The guide portion 360D extends forward while sloping downward. The guide portion 360D has two outer sections 362D and a middle section (beam support portion) 368D. The outer sections 362D are located at opposite sides of the guide portion 360D in the Y-direction, respectively. The outer sections 362D are connected to the bent portions 340D, respectively. The beam support portion 368D couples the outer sections 362D with each other in the Y-direction. Similar to the guide portion 360 (see FIG. 4), the guide portion 360D, which is formed as described above, prevents the contact 300D from being buckled.

The front coupling portion 396D functions as a protector similar to the protector 230 (see FIG. 4) of the connector 10. In detail, the front coupling portion 396D is located forward of the guide portions 360D. When the card 800 is not inserted in the connector 10 (see FIG. 4), a part of the front coupling portion 396D is located forward of the front end of the guide portion 360D in the X-direction and located at a position same as that of the front end of the guide portion 360D in the Z-direction. Moreover, when the card 800 is not inserted in the connector 10, the upper end of the front coupling portion 396D is located at a position roughly same as that of the front end of the guide portion 360D in the Z-direction. In detail, the upper end of the front coupling portion 396D is located slightly above the front end of the guide portion 360D. Similar to the protector 230, the thus-formed front coupling portion 396D can prevent the guide portion 360D from being buckled. In the present modification, the protector 396D is a part of the contact 300D.

The beam 370D is supported by the beam support portion 368D in a cantilever style to extend rearward from the beam support portion 368D while being curved. The contact portion 380 is provided on the beam 370D. Thus, the contact portion 380 is located forward of the rear coupling portion 392D in the X-direction. In detail, the contact portion 380 is located at an upper end of a protruding portion of the beam 370D, wherein the protruding portion protrudes upward. Accordingly, the position of the contact portion 380 is clear.

Since the spring portion 330D of the contact 300D is formed as described above, the spring length can be made longer similar to the spring portion 330 (see FIG. 11) of the contact 300. Moreover, since the contact portion 380 is near to the rear coupling portion 392D, similar to the spring portion 330, the contact portion 380 is not largely moved in the Y-direction even when the spring portion 330D receives a force in the Y-direction.

The present application is based on a Japanese patent application of JP2013-209490 filed before the Japan Patent Office on Oct. 4, 2013, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector attachable to an object having an upper surface in an up-down direction and connectable to a card inserted rearward thereinto along a front-rear direction perpendicular to the up-down direction, wherein:
the connector has a predetermined portion;
when the connector is attached to the object, the predetermined portion is located at a position same as that of the upper surface in the up-down direction;
the connector comprises a housing and a contact;
the contact has a held portion and a spring portion;
the held portion is held by the housing;
the spring portion has a contact portion and a guide portion;
the contact portion is located forward of the held portion in the front-rear direction;
the guide portion is located forward of the contact portion in the front-rear direction;
the guide portion extends forward while sloping downward;
the contact portion and the guide portion are movable in the up-down direction;
the contact portion is brought into contact with the card under an accommodating state where the card is inserted and accommodated in the connector;
during an insertion of the card, the guide portion is moved downward without being brought into contact with any part of the connector; and
at least a part of the guide portion is located below the predetermined portion in the up-down direction under the accommodating state.

2. The connector as recited in claim 1, wherein:
the housing holds the contact only by the held portion;
the spring portion has a bent portion;
at least a part of the bent portion is located between the held portion and the contact portion in the front-rear direction; and
the bent portion extends forward, and subsequently extends forward while sloping upward.

3. The connector as recited in claim 1, wherein:
the spring portion has a beam;
the guide portion has a beam support portion;
the beam is supported by the beam support portion in a cantilever style to extend rearward from the beam support portion; and
the contact portion is provided on the beam.

4. The connector as recited in claim 3, wherein:
the guide portion has two outer sections;
the outer sections are located at opposite sides of the guide portion, respectively, in a width direction perpendicular to both the up-down direction and the front-rear direction; and
the beam support portion couples the outer sections with each other in the width direction.

5. The connector as recited in claim 1, wherein:
the spring portion has a narrow portion; and
the spring portion has a size in a width direction perpendicular to both the up-down direction and the front-rear direction, wherein the size at a part of the spring portion becomes smaller as the part approaches the narrow portion away from a part located forward of the narrow portion and another part located rearward of the narrow portion.

6. The connector as recited in claim 1, wherein:
the spring portion has a front portion, a narrow portion and a rear portion; and
the front portion is positioned forward of the narrow portion in the front-rear direction;
the rear portion is positioned rearward of the narrow portion in the front-rear direction; and
in a width direction perpendicular to both the up-down direction and the front-rear direction, the spring portion has a shape with decreased sizes from the front portion to the narrow portion and with decreased sizes from the rear portion to the narrow portion.

7. The connector as recited in claim 1, wherein:
the connector comprises a protector; and
the protector is located forward of the guide portion.

8. The connector as recited in claim 7, wherein when the card is not inserted in the connector, a part of the protector is located forward of a front end of the guide portion in the front-rear direction and located at a position same as that of the front end of the guide portion in the up-down direction.

9. The connector as recited in claim 7, wherein the protector is a part of the housing.

10. The connector as recited in claim 9, wherein the protector is strengthened by a strengthening member.

11. The connector as recited in claim 7, wherein the protector is a part of the contact.

12. The connector as recited in claim 1, wherein:
the connector comprises a plurality of the contacts;
the contacts is arranged in a width direction perpendicular to both the up-down direction and the front-rear direction to form a contact row; and
the guide portion of the contact that is located at an end of the contact row in the width direction has a shape asymmetrical relative to middle of the guide portion in the width direction.

13. The connector as recited in claim 1, wherein:
the connector has a push-push mechanism; and
when the card under the accommodating state is temporally pushed rearward, the push-push mechanism ejects the card.

14. The connector as recited in claim 1, wherein:
during the insertion of the card under a state where the connector is attached to the object, the guide portion is moved downward without being brought into contact with any part of the object; and
at least a part of the guide portion is located below the upper surface of the object in the up-down direction under the accommodating state.

15. The connector as recited in claim 1, wherein:
the object is formed with a cut; and
when the card is inserted into the connector under a state where the connector is attached to the object, a part of the guide portion is moved into the cut from outside of the cut.

* * * * *